United States Patent [19]

Larsen

[11] Patent Number: 4,540,085
[45] Date of Patent: Sep. 10, 1985

[54] DEVICE FOR RAKING A STORAGE HEAP

[75] Inventor: Erik R. Larsen, Copenhagen, Denmark

[73] Assignee: F. L. Smidth & Co., Cresskill, N.J.

[21] Appl. No.: 391,465

[22] Filed: Jun. 23, 1982

[30] Foreign Application Priority Data

Jun. 24, 1981 [GB] United Kingdom ............... 8119425

[51] Int. Cl.³ .............................................. B65G 65/10
[52] U.S. Cl. .................................... 198/519; 414/133
[58] Field of Search ..................... 198/519; 414/133; 242/157 R; 226/168, 113, 108; 254/393, 374

[56] References Cited

U.S. PATENT DOCUMENTS

| 4,971 | 7/1812 | Weston | 254/393 |
| 64,527 | 5/1867 | Hardcastle | 254/393 |
| 519,586 | 5/1894 | Murphy | 254/393 |
| 2,934,211 | 4/1960 | Shivek | 254/374 |
| 4,264,256 | 4/1981 | Berthold | 198/519 |

FOREIGN PATENT DOCUMENTS

| 137569 | 9/1979 | Fed. Rep. of Germany | 414/133 |
| WO80/00333 | 3/1980 | PCT Int'l Appl. | 414/133 |
| 944673 | 12/1963 | United Kingdom | 414/133 |
| 1116429 | 6/1968 | United Kingdom | 414/133 |

Primary Examiner—Joseph E. Valenza
Assistant Examiner—Daniel R. Alexander
Attorney, Agent, or Firm—Pennie & Edmonds

[57] ABSTRACT

An apparatus for a raking device which illustratively includes a harrow, which moves along a bridge in a reciprocating direction and which includes a mechanism for ensuring that any motion of an apex of the harrow is substantially linear as the harrow moves throughout its entire range of travel, is described. Specifically, this mechanism is comprised of a flexible tension element which forms part of a hoist and is reeved between a stationary support and the harrow such that the effective length, of the part of the flexible tension element which determines the inclination of the harrow, is adjusted in direct response to the distance through which the harrow has moved along the bridge with respect to an end point of its travel.

13 Claims, 3 Drawing Figures

DEVICE FOR RAKING A STORAGE HEAP

BACKGROUND OF THE INVENTION

1. Field of the Invention

The invention relates to a device for raking material from a storage heap.

2. Description of the Prior Art

Material reclamation from a storage heap is often accomplished by raking material from one end face of the heap using a raking device which overlays that end face. This device is mounted on a bridge, which extends parallel to the base line of the end face and which travels in a reciprocating, i.e., back and forth, direction parallel to the end face of the heap.

In a well known arrangement, the raking device is comprised of a triangular harrow which is substantially the same size, i.e., width, as the end surface of the heap. The harrow is capable of performing a reciprocating movement over a short distance along and parallel to the bridge. The inclination of the harrow is set to correspond to the inclination of the end face from which material is to be raked. A hoisting mechanism, preferably constituted by one or more flexible tension elements, such as wire, and pulley blocks, is used to make this adjustment. The flexible tension element emanates from a point situated near the apex of the harrow and is connected to a tower which is fixedly mounted to the bridge. By virtue of the connection between the harrow and the stationary tower, the apex of the harrow describes a circular arc as the base of the harrow reciprocally moves parallel to and along the bridge.

To properly rake material from the entire end face of the heap, the harrow must move in straight line, i.e., linear, fashion across and parallel to the end face of the heap. As long as the width of the harrow is the same as or is larger than that of the end face of the heap, then any movement of the harrow is relatively small compared to the total possible distance through which the harrow can travel. As such, the circular arc described by the apex of the harrow approximates a straight line essentially providing the desired linear movement of the harrow across the end face of the heap.

Oftentimes, however, this linear movement is difficult to attain. This is particularly true whenever the width of the heap is large compared to that of the harrow. For such a case, the harrow is required to move a relatively large distance in order to cover the entire end face of the heap. As such, the movement of the apex of the harrow describes a large arc. Consequently, this movement significantly deviates from being linear. One way to produce linear movement for a relatively large heap is to ensure that the harrow will only move through a relatively small distance. This can be effectuated by continually increasing the size of the harrow such that the width of the harrow is always close to that of the end surface of the heap. However, this solution is quite unrealistic as the harrow would quickly become too large, too expensive and too heavy for it to be practical. Thus, since the size of the harrow will in most instances remain fixed, any movement of the harrow across the end face of the heap increasingly and disadvantageously deviates from being linear as the width of the heap increases.

Furthermore, this deviation is particularly evident whenever the harrow encounters the endface of an annular heap. Since the harrow is unsymmetrical with respect to the heap, i.e., the position of the stationary tower is not aligned with an axis of symmetry of the heap, the deviation resembles a monotonic function of the position of the harrow along the bridge. Specifically, the value of the deviation reaches a maximum at one extreme position of the harrow's movement, i.e., one end of the bridge, and is nearly zero at the other. By contrast, where the heap is straight, the stationary tower can be situated on the axis of symmetry of the storage heap. In this case, the value of the deviation is zero or minimum whenever the harrow is in its center position and takes on a maximum value in either of the two extreme or end positions of the harrow's travel.

Various attempts have been made in the art to compensate for any undesired circular movement of the harrow's apex by extending or shortening the wire connecting the harrow to the stationary tower. To accomplish this, hydraulic cylinders or motors are used for winding in or paying out the wire. These solutions, however, require expensive additional equipment such as motors and synchronizing equipment.

SUMMARY OF THE INVENTION

Accordingly, an object of the present invention is to provide an arrangement for a raking device which moves in a linear fashion parallel to and across an end face of a storage heap regardless of the width of the heap relative to that of the harrow.

A particular object of the present invention is to provide an arrangement for a raking device which moves in a linear fashion across an end face without requiring that the size of the harrow be increased as the width of the heap increases.

A more particular object of the present invention is to provide an inexpensive arrangement of a raking device which moves in a linear fashion across the end face.

In accordance with the teachings of the present invention, a flexible tension element of a hoist is reeved between the stationary support and the harrow itself such that the length of a part of the flexible tension element which determines the inclination of the harrow is adjusted in direct response to the distance through which the harrow has moved along the bridge. As a result, any non-linear movement of an upper part of the harrow, i.e. the apex, is automatically and substantially compensated as the harrow moves throughout its travel.

In accordance with a specific embodiment disclosed herein, a raking device for raking material from an end face of a storage heap comprises a raking harrow, a lower part of which is mounted for reciprocal movement along a base line, in use parallel to the bottom of the end face; and a hoist connected between the harrow above the base line and a stationary support to control the inclination of the harrow; wherein a flexible tension element of the hoist is reeved between the support and the harrow in such a way that the effective length of a part of the element determining the inclination of the harrow is adjusted in direct response to movement of the lower part along the base line whereby non-linear movement of an upper part of the harrow is automatically at least partly compensated.

Specifically, a portion of the flexible tension element extends along, i.e parallel to, the base line and is so coupled to a lower part of the harrow that its effective length is dependent upon the position of the lower part along the bridge or base line. Consequently, the action of the hoist is a linear function of the particular position of the harrow during its reciprocating motion.

The hoist may advantageously include a winch for taking in or paying out the flexible tension element to adjust the inclination of the harrow in order to accommodate heaps of material with different natural angle of repose. The winch is preferably placed in a stationary position on a bridge; however, it may be mounted on the harrow so as to move with it during its reciprocating motion.

The reeving may involve the use of conventional sheaves or pulleys having a velocity ratio. This ratio can be expressed as the ratio between the distance, measured from an end point of the harrow's travel, through which the lower part of the harrow has moved along the bridge, or base line, and the difference, attributable to that movement of the harrow in the effective length of the flexible tension element which connects the harrow to the stationary support. The ratio may be set to a predetermined value by using multiple sheaves in a known manner. For example, in a simple layout with a stationary placed winch, the ratio is one in n where n is an even number whose value is dependent upon the number of sheaves used. Using a value of 4 for n has been empirically determined to be an expedient value for n.

For such an arrangement, the support, which controls the inclination of the harrow, is preferably positioned so that:

$$l_2 - l_1 = (V/n)$$

where $l_1$ and $l_2$ are the distance, in the extreme end positions of the travel of the harrow, between the points of attachment of the flexible tension element to the stationary support and to the harrow;

V is the distance, measured from an end position, through which the harrow has moved, i.e., its migration, and, n is the velocity ratio mentioned hereinabove.

Through this arrangement, total correction of the deviation is achieved in the extreme end positions of the harrow's travel. However, a small deviation remains in intermediate positions of the harrow's travel. This occurs because the compensation is made as a linear function of the harrow's position. However, this remaining deviation is zero if the compensation is based upon a hyperbolic function of the harrow's position.

In accordance with a feature of the invention, full compensation of any non-linear movement throughout the harrow's entire range of travel can be achieved if at least one of the sheaves or pulleys is comprised of portions having different curvatures. In this way, linear movement of the flexible tension element at the sheave entrace is converted by virtue of the dissimilar curvature of the sheave into a relatively non-linear movement at the exit from the sheave.

DESCRIPTION OF THE DRAWING

An example of a raking device embodying the teachings of the present invention is illustrated in the accompanying drawings, in which.

DETAILED DESCRIPTION

Raking devices which are used to rake material from across an end face of a storage heap are well known in the art. Such devices typically employ a harrow. To effectively rake material from across the entire end face of the heap, i.e. without missing any areas, the harrow must move back and forth in a straight line, i.e., in a linear fashion, across and parallel to the entire end face. Linear movement can be readily obtained as long as any movements of the harrow are kept relatively small. As long as the width of the harrow is the same as or is larger than that of the end face of the storage heap, this result occurs. Often times, however, the storage heap is large with its width being greater than that of the harrow. As such, the harrow must move a relatively large distance to traverse the entire end surface. Consequently, by virtue of the harrow being fixed to a stationary support, the movement of the harrow, and in particular its apex, disadvantageously takes on an arc-like or circular appearance and thus deviates from being linear. This deviation increases as the width of the heap relative to that of the harrow increases.

The present invention, therefore, is directed to an arrangement for a raking device which illustratively includes a harrow, and which advantageously produces linear motion of the harrow across the end face of the storage heap, regardless of the width of the heap compared to that of the harrow.

Figure 1:
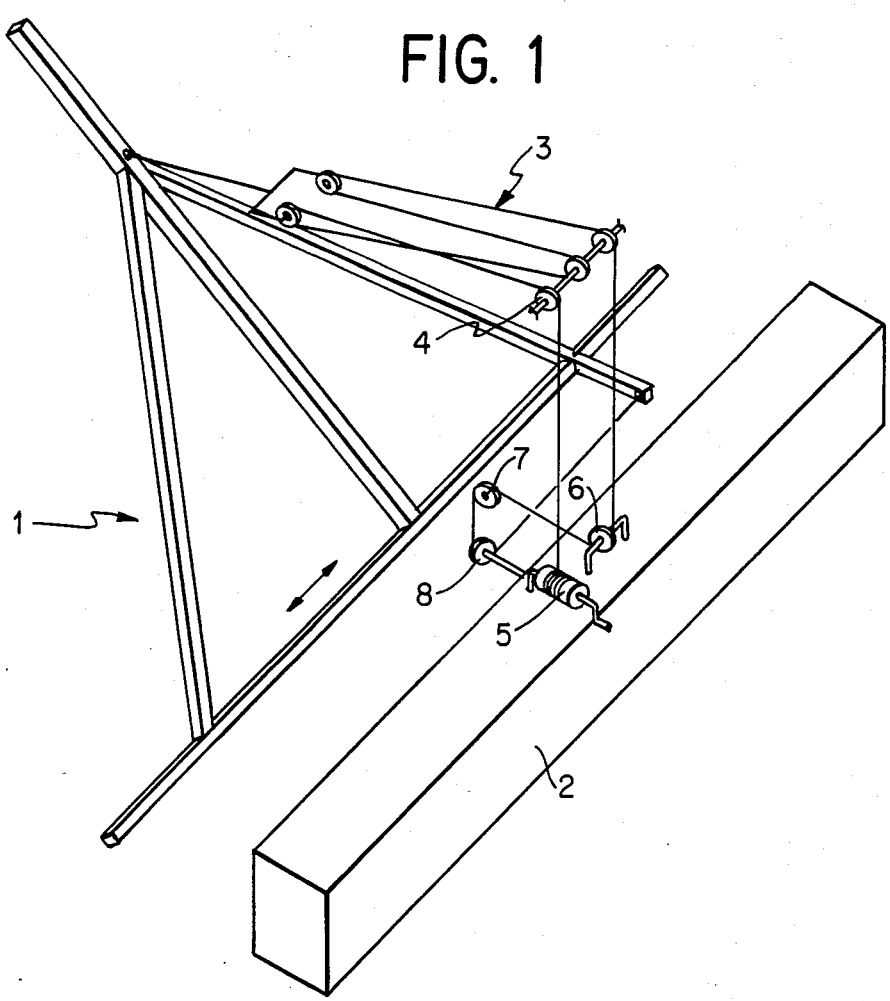
FIG. 1 diagrammatically shows a bridge scraper having a raking harrow.

FIG. 1 diagrammatically shows a harrow 1, adapted for reciprocating movement in the direction of its base line—as indicated by the double-ended arrow shown in FIG. 1—along and parallel to a bridge 2. The inclination of harrow 1 is determined by wire system 3 which is attached to the harrow at an appropriate point between the apex of the harrow and its base line. The wire system is secured to a stationary support tower or support (not shown). The tower is advantageously situated such that a flexible tension wire, which comprises wire system 3 and which specifically connects the harrow to the tower, lies on one side of a plane which is oriented substantially perpendicular to the bridge and which runs through the point of attachment. One end of the flexible tension wire which comprises wire system 3 passes over a sheave or pulley 4 and is connected to a winch 5. This winch permits the inclination of the harrow to be adjusted to a desired value. The other end of the wire passes over a succession of sheaves 6, 7 and 8 and is thereafter connected to bracket (or extension) 9. This bracket is in turn mounted on harrow 1. Sheave 8 and bracket 9 are mounted with respect to each other such that the flexible tension wire is slackened or tightened in a direction substantially parallel to the direction of movement of the harrow. In this way, the length of the wire between sheave 8 and bracket 9 is advantageously a linear function of the position of harrow 1 along the bridge throughout the range of its movement. However, for practical reasons, it may be necessary to position bracket 9 and sheave 8 such that the length of the wire running between the bracket and sheave is oriented at an angle with respect to the direction of the reciprocating movement. This angular orientation introduces a small error which can either be disregarded or corrected in a way described hereinbelow.

Figure 2:
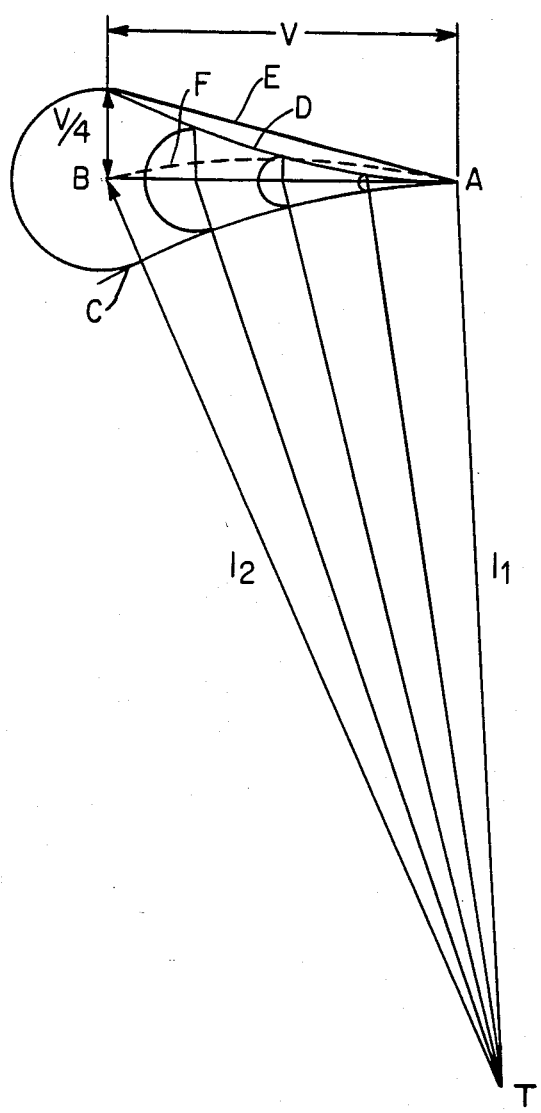
FIG. 2 graphically shows the desired and the achieved compensation.

FIG. 2 diagrammatically shows the portion of the flexible tension wire which connects the stationary tower to harrow 1 for various positions throughout the range of travel of the harrow. This figure does not depict the fact that the flexible tension wire does not move in a plane whenever the point of attachment of the wire to the harrow does not move along a straight line. Points A and B depict the extreme or end points in the entire range of travel of the harrow. Hence, the desired linear migration V performed by the point of attachment of the flexible tension wire to the harrow is indicated by line segment AB. The distance from points A and B to the point of attachment T on the lower is $l_1$ and $l_2$, respectively. All the pulleys or sheaves associated with wire system 3 form a hoist which has a velocity or gearing ratio. This ratio can be expressed as the ratio between the distance, measured from an end point, through which the lower part of the harrow has moved along the bridge, or base line, and the difference, attributable to this movement, in the effective length of the flexible tension wire which connects the harrow to the stationary tower. The point of attachment is appropriately chosen on the harrow such that if the gearing ratio of the hoist system is 4 to 1, then $l_2 - l_1 = V/4$.

By virtue of the connection between the harrow and the stationary tower, both the apex of the harrow and its point of attachment to the flexible tension element described as circular arc C as the base of the harrow reciprocally moves throughout its entire range of travel. By following radii emanating from point T to respective points of intersection with arc C and straight line AB, an indication is obtained the extent to which the flexible tension wire at a given time should be extended in order to achieve the desired linear movement. This requisite extension is the distance between arc C and straight line AB, for any position of the harrow throughout its range of travel, and is indicated graphically by curve D. However, if linear compensation is used, then the extension indicated graphically by straight line E is employed. Consequently, the point of attachment of the harrow follows curve F, which is a better approximation to straight line AB than is arc C. If hyperbolic, rather than linear compensation is used, then any remaining deviation would be essentially zero throughout the full range of travel of the harrow.

However, if the above described linear compensation is employed, then substantially any remaining deviation, i.e., non-linear movement, could advantageously be eliminated if one or more of the sheaves or pulleys 6, 7 or 8 (shown in FIG. 1) is constructed such that a non-linear relationship occurs between the amount of flexible tension wire being wound up on the sheave and that being simultaneously wound off the sheave.

Figure 3:
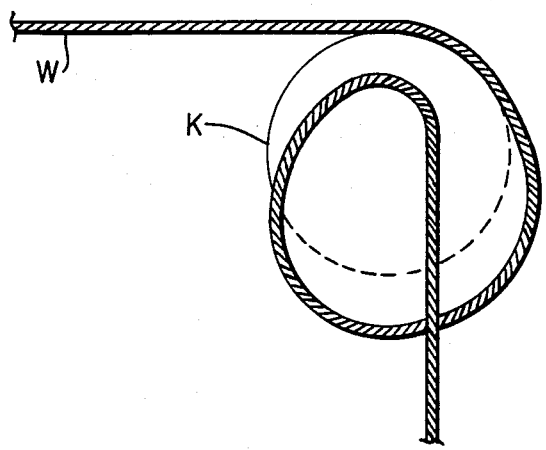
FIG. 3 diagrammatically shows a sheave having portions of different curvature and used in the arrangement shown in FIG. 1 in order to provide full compensation of any non-linear movement.

FIG. 3 diagrammatically shows an embodiment of such a sheave. As shown, the sheave has portions of different curvature and thus produces the desired non-linear connection. Specifically, as wire W is wound up on the circular part of curved half K of the sheave, less wire is initially wound off than simultaneously wound on. At a given time, the reverse happens. The exact construction of the curved wire path, i.e., its radius measured from the center of the sheave to any point of the periphery of the sheave, is computed on the basis of the known necessary non-linear compensation.

I claim:

1. An arrangement for a raking device which travels in a reciprocating direction comprising:
    (a) a harrow which moves along a bridge positioned parallel to a baseline, and attached at a point above the base line by a flexible tension element to a tower, said tower being situated such that the flexible tension element which connects the harrow to the tower lines on one side of a plane which is oriented subsequently perpendicular to the bridge and which runs through the point of attachment, and
    (b) a hoist having a velocity ratio and at least one pulley located between the support and the harrow, through which the flexible tension element is reeved, to adjust the inclination of the harrow,
    said raking device characterized in that the length of the flexible tension element is continuously adjusted in direct response to the position of the harrow along the bridge so as to ensure that any motion of the harrow is substantially linear.

2. The invention in claim 1 in which the raking device is further comprised of a winch mounted on said bridge and attached to one end of said flexible tension element.

3. The invention in claim 2 in which the first pulley, which contacts the flexible tension element and is positioned closest to the winch, is situated such that the flexible tension element is taken in or paid out in a direction substantially parallel to the direction of movement of the harrow.

4. The invention in claim 3 in which the tower is positioned on the bridge at a location, measured from an apex of the harrow, where the difference between the respective distance of a length of that portion of the flexible tension element which connects the harrow to the support in each of two extreme positions of the travel of the harrow substantially equals the total distance measured along the base line through which the harrow can travel, divided by the velocity ratio of the hoist.

5. The invention in claim 1 in which the first pulley, which contacts the flexible tension element and is positioned closest to the winch, is situated such that the flexible tension element is taken in or paid out in a direction substantially parallel to the direction of movement of the harrow.

6. The invention in claim 5 in which the tower is positioned on the bridge at a location, measured from an apex of the harrow, where the difference between the respective distance of a length of that portion of the flexible tension element which connects the harrow to the support in each of two extreme positions of the travel of the harrow substantially equals the total distance measured along the base line through which the harrow can travel, divided by the velocity ratio of the hoist.

7. An arrangement for a raking device which travels in a reciprocating direction comprising:
    (a) a harrow which moves along a bridge, positioned parallel to a base line, and attached at a point above the base line by a flexible tension element to a tower, said tower is situated such that the flexible tension element which connects the harrow to the tower lies on one side of a plane which is oriented substantially perpendicular to the bridge and which runs through the point of attachment, and
    (b) a hoist having a velocity ratio and at least one pulley located between the support and the harrow, through which the flexible tension element is reeved, to adjust the inclination of the harrow,
    said arrangement characterized in that
    (i) the length of the flexible tension element is continuously adjusted in direct response to the position of the harrow along the bridge so as to ensure that any motion of the harrow is substantially linear, and (ii) one end of the flexible tension element is connected to the harrow through said pulleys such that the reciprocating movement of the harrow alternately takes in and pays out the flexible tension element.

8. The invention in claim 7 in which the raking device is further comprised of a winch mounted on said bridge and attached to one end of said flexible tension element.

9. The invention in claim 8 in which the first pulley, which contacts the flexible tension element and is positioned closest to the winch, is situated such that the flexible tension element is taken in or paid out in a direction substantially parallel to the direction of movement of the harrow.

10. The invention in claim 9 in which the tower is positioned on the bridge at a location, measured from an apex of the harrow where the difference between the respective distance of the length of that portion of the flexible tension element which connects the harrow to the support in each of two extreme positions of the travel of the harrow substantially equals the total distance, measured along the base line through which the harrow can travel, divided by the velocity ratio of the hoist.

11. The invention in claim 7 in which the first pulley contacts the flexible tension element and is positioned closest to the winch, which is situated such that the flexible tension element is taken in or paid out in a direction substantially parallel to the direction of movement of the harrow.

12. The invention in claim 11 in which the tower is positioned on the bridge at a location measured from an apex of the harrow where the difference between the respective distance of the length of that portion of the flexible tension element which connects the harrow to the support in each of the two extreme positions of travel of the harrow substantially equals the total distance, measured along the base line through which the harrow can travel, divided by the velocity ratio of the hoist.

13. A raking device comprising: means for bringing about a linear movement of the apex of a raking harrow which performs a reciprocating movement along its base line and having a point above that line which is connected to a stationary tower on a bridge being parallel to the base line of the harrow characterized in that the connection between harrow and tower is constituted by a hoist composed of a wire and pulley blocks and that the tower is situated in such a way that the connection is always at the same side of a plane perpendicular to the bridge through the point of attachment on the tower, and that one end of the wire is connected to the harrow over a train of pulleys so that the harrow through its reciprocating movement alternatingly takes in and pays out the wire.

* * * * *

UNITED STATES PATENT AND TRADEMARK OFFICE
CERTIFICATE OF CORRECTION

PATENT NO. : 4,540,085

DATED : September 10, 1985

INVENTOR(S) : Erik R. Larsen

It is certified that error appears in the above-identified patent and that said Letters Patent is hereby corrected as shown below:

```
Column 6, line 3, "tower lines" should be
--tower lies--.

Column 6, line 4, "subsequently" should be
--substantially--.
```

Signed and Sealed this

Eighteenth Day of February 1986

[SEAL]

Attest:

DONALD J. QUIGG

Attesting Officer

Commissioner of Patents and Trademarks